United States Patent Office 3,322,758
Patented May 30, 1967

3,322,758
CERTAIN DERIVATIVES OF β-AMINO-PROPIOPHENONES
Kurt Thiele, Frankfurt am Main, and Klaus Posselt, Bergen-Enkheim, Germany, assignors to Deutsche Gold- und Silber-Scheideanstalt vormals Roessler, Frankfurt am Main, Germany
No Drawing. Filed Dec. 18, 1964, Ser. No. 419,593
Claims priority, application Germany, Dec. 21, 1963, D 43,235
8 Claims. (Cl. 260—247.5)

The present invention relates to novel araliphatic amines of the following formula

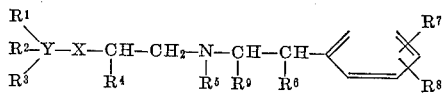

wherein:
X = —CO— or —CHOH,
Y = a phenyl radical or a condensed multi-ring aromatic radical, one or more rings of which can be partially or completely saturated, such as, for example, phenyl, naphthyl, tetrahydronaphthyl, fluorene, anthracene or phenanthrene,
$R^1$ = —O—Alk—OH, —O—Alk'—(OH)$_2$ or

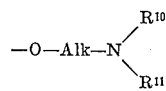

wherein Alk is a straight or branch chained alkylene group of 1 to 6 carbon atoms, Alk' is a straight or branch chained trivalent radical of the formula $C_nH_{2n-1}$ wherein $n$ is an integer from 2 to 6 and each of $R^{10}$ and $R^{11}$ is hydrogen, lower alkenyl or lower alkyl which can be joined together with each other or with Alk to a 5, 6 or 7 membered ring and such ring, if desired, can contain a further heteroatom, preferably, oxygen or sulfur, or the group —NH—. The ring furthermore may be substituted by lower alkyl lower alkanoic acyl, benzyl, hydroxy lower alkyl, lower alkanoic acyloxy lower alkyl, carboxy ester and carbonyl amide groups,
$R^2$, $R^3$ = hydrogen, hydroxy, methoxy, nitro or chlorine,
$R^7$ and $R^8$ = H, $CH_3O$—, —$NO_2$ or —Cl,
$R^4$ = hydrogen, methyl or ethyl,
$R^5$ and $R^9$ each = hydrogen or methyl and
$R^6$ = hydrogen or hydroxy and their pharmaceutically acceptable acid addition salts and quaternary ammonium compounds.

The compounds according to the invention have useful pharmaceutical properties, especially for heart and circulation conditions. They are particularly suited for improvement of the heart function in possessing activity favorably increasing the heart output with a simultaneous good coronary dilating activity.

For sake of simplicity in the following general description of the process for the production of the novel compounds of the invention the radical

appearing at the left end of the structural formula given for such compounds will be designated as Ph$^1$— and the radical

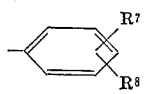

appearing at the right end of such structural formula will be designated as —Ph$^2$.

The compounds according to the invention can, for example, be produced by reacting a compound of the formula

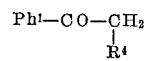

with a compound of the formula

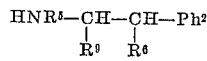

together with formaldehyde or a formaldehyde yielding substance. Preferably such reaction is carried out at raised temperatures in the presence of a solvent.

It also is possible to react a compound of the formula

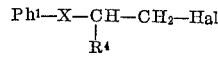

wherein Hal is a halogen atom, preferably, chlorine or bromine, with a compound of the formula

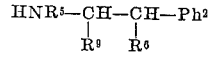

Preferably, such reaction is carried out at raised temperatures in the presence of a solvent and a basically reacting substance such as alkali metal alcoholate, sodium amide, potassium carbonate, a tertiary amine or the like.

Similarly the compounds can also be prepared by reacting a compound of the formula

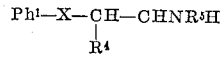

with a compound of the formula

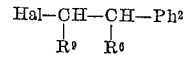

In the event the compound produced is one wherein —X— is —CO— it is possible to convert such compound or its salts into a compound wherein —X— is —CH(OH)— by catalytic hydrogenation, that is, treatment with hydrogen in the presence of a catalyst, or other reductions known per se using, for example, sodium or lithium borohydride, alkali metal alcoholates, alkaline earth metal alcoholates or aluminum alcoholates as the reducing agents.

In addition, compounds according to the invention wherein X=—CO— can be prepared by reacting a compound of the formula Ph$^1$Me, wherein Me is a lithium, sodium or potassium atom, or a compound of the formula Ph$^1$MgHal with a compound of the formula

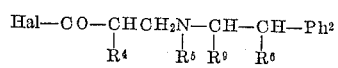

wherein Hal is a halogen atom, preferably, chlorine or bromine.

Compounds according to the invention also can be prepared by reacting a compound of the formula Ph$^1$MgHal with a compound of the formula

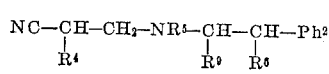

In the presence of water the amino ketones according to the invention are produced.

It also is possible to produce the compounds according to the invention by reductive condensation of a compound of the formula

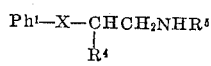

with a compound of the formula

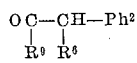

The bases which are produced which contain optically active carbon atoms and as a rule occur as racemates can be reacted with an optically active acid and be resolved into the optically active isomers by fractional precipitation or crystallization.

Furthermore, the novel bases according to the invention can be converted to their acid addition salts with acids having pharmaceutically acceptable anions such as HCl, $H_2SO_4$, $H_3PO_4$, citric acid, lactic acid, succinic acid, maleic acid and the like and also to the quaternary ammonium compounds with pharmaceutically acceptable quaternizing agents.

The following examples will serve to illustrate the invention with reference to a number of specific embodiments thereof.

The radical Z in the formulae given in the examples signifies the radical

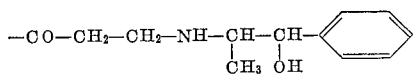

EXAMPLE 1

*1-N[3-phenyl-3-hydroxypropyl-(2)]-β-amino-3-(2-hydroxy-ethoxy)-propiophenone.HCl*

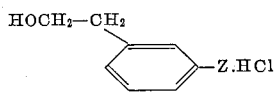

15.1 g. of 1-norephedrine were dissolved in 100 cc. of isopropanol and 18 cc. of isopropanolic HCl added thereto to provide a weak acidic reaction. Then 3.6 g. of paraformaldehyde and 18 g. of 3-(2-hydroxy-ethoxy)-acetophenone were added and the mixture boiled under reflux for 5 hours. The end product separated out from the reaction mixture upon cooling as white crystals. The melting point after recrystallization from isopropanol was 139–142° C.

Analogously the following compounds were prepared using paraformaldehyde, 1-norephedrine and the acetophenone indicated as starting materials.

(a) 1 - [3 - (2 - dihydroxy - propoxy) - phenyl] - {2-[3 - phenyl - 3 - hydroxy - propyl - (2) - amino] - ethyl}-ketone.HCl

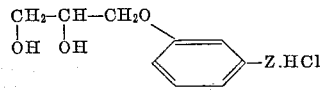

using: 3-(2,3-dihydroxy-propoxy)-acetophenone. Its melting point after recrystallization from methanol was 150–153° C.

(b) 1 - N - [3 - phenyl - 3 - hydroxy - propyl - (2)]-β -amino - 3 - (2 - dimethylamino - ethoxy) - propiophenone.2HCl

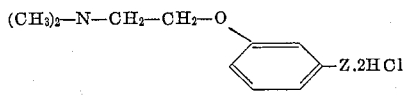

using: 3 - (2 - dimethylamino-ethoxy)-acetophenone. Its melting point after recrystallization from methanol was 186–188° C.

(c) 1 - 3 - (2 - diallylamino - ethoxy) - phenyl - {2-[3 - phenyl - 3 - hydroxy - propyl - (2) - amino] - ethyl}-ketone.2HCl

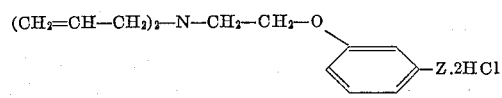

using: 3-(2-diallylamino-ethoxy)-acetophenone. Its melting point after recrystallization from ethanol was 183° C.

(d) 1 - N - [3 - phenyl - 3 - hydroxy - propyl - (2)]-β - amino - 3 - (3 - dimethylamino - propoxy) - propiophenone.2HCl

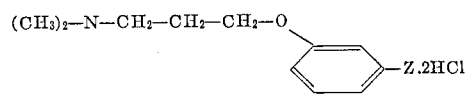

using: 3-(3-dimethylamino-propoxy) - acetophenone. Its melting point after recrystallization from methanol was 202–204° C.

(e) 1 - N - [3 - phenyl - 3 - hydroxy - propyl - (2)]-β - amino - 3 - (1 - dimethylamino - isopropoxy) - propiophenone.2HCl

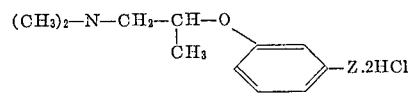

using: 3-(1-dimethylamino-isopropoxy)-acetophenone. Its melting point after recrystallization from ethanol was 162–164° C.

(f) 1 - N - [3 - phenyl - 3 - hydroxy - propyl - (2)]-β - amino - 2 - (3 - diethylamino - propoxy) - propiophenone.2HCl

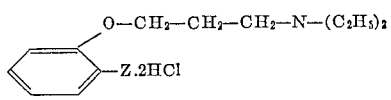

using: 2 - (3 - diethylamino-propoxy)-acetophenone. Its melting point after recrystallization from ethanol was 194–196° C.

(g) 1 - N - [3 - phenyl - 3 - hydroxy - propyl - (2)]-β - amino - 3 - (3 - piperidino - propoxy) - propiophenone.2HCl

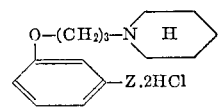

using: 3-(3-piperidino-propoxy)-acetophenone. Its melting point after recrystallization from methanol was 211–213° C.

(h) 1 - N - [3 - phenyl - 3 - hydroxy - propyl - (2)] β - amino - 3 - (2-morpholino - ethoxy) - propiophenone.2HCl

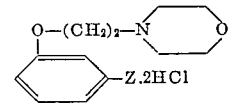

using: 3-(2-morpholino-ethoxy)-acetophenone. Its melting point after recrystallization from ethanol was 194–196° C.

(i) 1 - N - [3 - phenyl - 3 - hydroxypropyl - (2)] - β-amino - 3 - methoxy - 5 - (3 - dimethylamino - propoxy)-propiophenone.2HCl

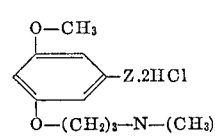

using: 3 - methoxy-5-(3-dimethylamino - propoxy)acetophenone. Its melting point after recrystallization from ethanol was 183–185° C.

(j) 1 - N - [3 - phenyl - 3 - hydroxy - propyl - (2)] - β-amino - 3 - methoxy - 4 - (2 - dimethylamino - ethoxy)-propiophenone.2HCl

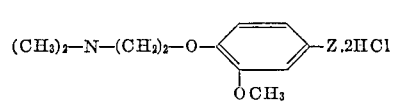

using: 3 - methoxy - 4 - (2 - dimethylamino - ethoxy) acetophenone. Its melting point after recrystallization from methanol was 200–202° C.

EXAMPLE 2

{2-[3-phenyl-3-hydroxy-propyl-(2)-amino]-ethyl}-{4-[3-dimethylamino-propoxy]naphthyl-(1)-}-ketone

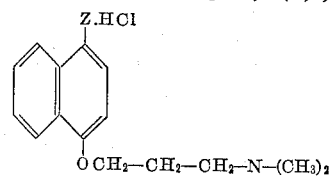

14.5 g. (0.047 mol) of 1-acetyl-4-(3-dimethylamino-propoxy) - naphthalene.HCl, 8.7 g. (0.47 mol) of 1-norephedrine.HCl and 2.5 g. (0.083 mol) of paraformaldehyde in 100 cc. of isopropanol to which 5 drops of conc. HCl had been added were boiled under reflux on a water bath for 2 hours. After 1 hour's boiling a further 3 g. (0.1 mol) of paraformaldehyde were added. The solution was then cooled and 100 cc. of acetone added and then allowed to stand for 1 day. The dihydrochloride which precipitated out was recrystallized from methanol. Its melting point after such recrystallization was 202–205° C.

We claim:
1. A compound selected from the group consisting of
 1-N[3-phenyl-3-hydroxypropyl-(2)]-β-amino-3-(2-hydroxy-ethoxy)-propiophenone hydrochloride,
 1-[3-(2-dihydroxy-propoxy)-phenyl]-{2-[3-phenyl-3-hydroxy-propyl-(2)-amino]-ethyl}-ketone hydrochloride,
 1-N-[3-phenyl-3-hydroxy-propyl-(2)]-β-amino-3-(2-dimethylamino-ethoxy)-propiophenone dihydrochloride,
 1-3-(2-diallylamino-ethoxy)-phenyl-{2-[3-phenyl-3-hydroxy-propyl-(2)-amino]-ethyl}-ketone dihydrochloride,
 1-N-[3-phenyl-3-hydroxy-propyl-(2)]-β-amino-3-(3-dimethylamino-propoxy)-propiophenone dihydrochloride,
 1-N-[3-phenyl-3-hydroxy-propyl-(2)]-β-amino-3-(1-dimethylamino-isopropoxy)-propiophenone dihydrochloride,
 1-N-[3-phenyl-3-hydroxy-propyl-(2)]-β-amino-2-(3-diethylamino-propoxy)-propiophenone dihydrochloride,
 1-N-[3-phenyl-3-hydroxy-propyl-(2)]-β-amino-3-(3-piperidino-propoxy)-propiophenone dihydrochloride,
 1-N-[3-phenyl-3-hydroxy-propyl-(2)]-β-amino-3-(2-morpholino-ethoxy)-propiophenone dihydrochloride,
 1-N-[3-phenyl-3-hydroxypropyl-(2)]-β-amino-3-methoxy-5-(3-dimethylamino-propoxy)-propiophenone dihydrochloride,
 1-N-[3-phenyl-3-hydroxy-propyl-(2)]-β-amino-3-methoxy-4-(2-dimethylamino-ethoxy)-propiophenone dihydrochloride, and
 {2-[3-phenyl-3-hydroxy-propyl-(2)-amino]-ethyl}-{4-[3-dimethylamino-propoxy]-naphthyl-(1)}-ketone dihydrochloride
 and the corresponding free base.

2. A compound selected from the group consisting of 1-N[3-phenyl-3-hydroxy-propyl-(2)]-β-amino-3-(2-hydroxy-ethoxy)-propiophenone hydrochloride and the corresponding free base.

3. A compound selected from the group consisting of 1-[3-(2-dihydroxy-propoxy)-phenyl]-{2-[3-phenyl-3-hydroxy-propyl-(2)-amino]-ethyl}-ketone hydrochloride and the corresponding free base.

4. A compound selected from the group consisting of 1-N-[3-phenyl-3-hydroxy-propyl-(2)]-β-amino-3-(2-dimethylamino-ethoxy)-propiophenone dihydrochloride and the corresponding free base.

5. A compound selected from the group consisting of 1-N-[3-phenyl-3-hydroxy-propyl-(2)]-β-amino-3-(3-dimethylamino-propoxy)-propiophenone dihydrochloride and the corresponding free base.

6. A compound selected from the group consisting of 1-N-[3-phenyl-3-hydroxy-propyl-(2)-β-amino-3-(3-piperidino-propoxy)-propiophenone dihydrochloride and the corresponding free base.

7. A compound selected from the group consisting of 1-N-[3-phenyl-3-hydroxy-propyl-(2)]-β-amino-3-(2-morpholino-ethoxy)-propiophenone dihydrochloride and the corresponding free base.

8. A compound selected from the group consisting of {2-[3-phenyl-3-hydroxy-propyl-(2)-amino]ethyl}-{4-[3-dimethylamino-propoxy]-naphthyl-(1)}-ketone dihydrochloride and the corresponding free base.

References Cited

UNITED STATES PATENTS

| | | | |
|---|---|---|---|
| 2,619,485 | 11/1952 | Chabrier et al. | 260—247.5 |
| 3,185,691 | 5/1965 | Pribyl et al. | 167—65 |
| 3,193,579 | 7/1965 | Goldberg et al. | 167—65 |
| 3,225,095 | 12/1965 | Thiele | 260—570.6 |

FOREIGN PATENTS

| | | |
|---|---|---|
| 921,940 | 1/1955 | Germany. |

ALEX MAZEL, *Primary Examiner.*

HENRY R. JILES, *Examiner.*

RICHARD J. GALLAGHER, *Assistant Examiner.*